(12) United States Patent
Blair

(10) Patent No.: US 7,891,725 B2
(45) Date of Patent: Feb. 22, 2011

(54) PASSENGER SERVICE VEHICLES

(75) Inventor: Paul Blair, Broughshane (GB)

(73) Assignee: The Wrights Group Limited, Ballymena, Co. Antrim (IE)

( * ) Notice: Subject to any disclaimer, the term of this patent is extended or adjusted under 35 U.S.C. 154(b) by 884 days.

(21) Appl. No.: 11/629,160

(22) PCT Filed: May 12, 2005

(86) PCT No.: PCT/GB2005/001790

§ 371 (c)(1),
(2), (4) Date: Jun. 20, 2007

(87) PCT Pub. No.: WO2005/120934

PCT Pub. Date: Dec. 22, 2005

(65) Prior Publication Data
US 2007/0252400 A1 Nov. 1, 2007

(30) Foreign Application Priority Data

Jun. 9, 2004 (GB) ................................. 0412857.5
Sep. 21, 2004 (GB) ................................. 0420934.2

(51) Int. Cl.
*B62D 31/02* (2006.01)
(52) U.S. Cl. ...................................... 296/178; 296/24.4
(58) Field of Classification Search ................. 296/178, 296/179, 24.4; D12/84
See application file for complete search history.

(56) References Cited

U.S. PATENT DOCUMENTS

| 1,626,074 | A | * | 4/1927 | Brewster ...................... 296/85 |
| 1,980,613 | A | | 11/1934 | Curtiss ........................ 280/403 |
| 2,267,509 | A | | 12/1941 | Strong .................... 296/190.01 |
| 2,563,917 | A | * | 8/1951 | Caesar et al. ................ 296/178 |
| 2,860,912 | A | * | 11/1958 | Barenyi ...................... 296/24.4 |
| 4,035,014 | A | | 7/1977 | Sellers et al. ............. 296/24.46 |
| 4,227,735 | A | | 10/1980 | Joyner et al. ............. 296/24.46 |
| 4,535,713 | A | * | 8/1985 | van Roon ..................... 114/71 |
| 5,069,497 | A | | 12/1991 | Clelland et al. ............. 296/155 |
| D442,888 | S | * | 5/2001 | Papke et al. .................. D12/84 |
| 6,772,851 | B1 | * | 8/2004 | Dill ........................... 180/89.1 |
| 2002/0117874 | A1 | | 8/2002 | Taylor ........................ 296/178 |
| 2005/0280524 | A1 | * | 12/2005 | Boone et al. ................ 340/461 |

FOREIGN PATENT DOCUMENTS

| CH | 387467 | * | 5/1965 |
| DE | 200 05 771 | | 6/2000 |
| DE | 199 23 188 A1 | | 11/2000 |
| EP | 0 010 995 | | 5/1980 |
| GB | 350538 | * | 9/1939 |
| IT | 484784 | * | 9/1953 |
| WO | WO 00/50269 A | | 8/2000 |

* cited by examiner

Primary Examiner—Dennis H Pedder
(74) Attorney, Agent, or Firm—Jenkins, Wilson, Taylor & Hunt, P.A.

(57) ABSTRACT

A passenger service vehicle having a driver's area including a driver's seat and driving controls and a passenger area including at least one passenger entrance and a plurality of passenger seats, the driver's area being defined by the front of the vehicle, and the foremost portion of each side of the vehicle, and a partitions extending partially, substantially or wholly across a front portion of the passenger service vehicle to separate the driver's area from the passenger area.

20 Claims, 3 Drawing Sheets

PASSENGER SERVICE VEHICLES

The present invention relates to improvements relating to passenger service vehicles, particularly but not exclusively the driver's area of such vehicles.

Passenger service vehicles generally have a frame, two or more wheel axles, such as a front wheel axle and one or more rear wheel axles, each axle having a least two wheels mounted thereon, a driver's area including a driver's seat and driving controls, and a passenger area. The passenger area includes at least one passenger entrance for the boarding and alighting of passengers, usually with one or more doors, and a plurality of passenger seats.

According to a first aspect of the present invention, there is provided a passenger service vehicle having a driver's area including a driver's seat and driving controls and a passenger area including at least one passenger entrance and a plurality of passenger seats, the driver's area being defined by the front of the-vehicle, and the foremost portion of each side of the vehicle, and a partitions extending partially, substantially or wholly across a front portion of the passenger service vehicle to separate the driver's area from the passenger area.

According to one embodiment of the present invention, the partition extends across the width of the vehicle.

Preferably the partition is substantially concave in shape when viewed from the passenger area, whereby the partition provides increased room in the remainder of the bus compared with the use of a flat partition.

The partition may include one or more sections, one of which, preferably a central section, may comprise a door providing access to the driver's area.

In a preferred embodiment the passenger service vehicle includes two or more wheel axles, wherein the driver's seat is located wholly or substantially over the front wheel axle. Preferably the partition is provided behind the front wheel axle, more preferably immediately behind the front wheel arches of the passenger service vehicle.

This positioning of the driver on his seat provides significantly increased elevation for the driver, as well as increased visibility, a major factor in ease of driving any vehicle but especially a passenger service vehicle such as a bus or coach.

The driver's area is preferably above the level of at least the adjacent portion of the passenger area.

Preferably a passenger entrance having one or more doors is provided directly behind the partition separating the driver's area from the passenger area.

In a preferred embodiment the passenger area has a flat floor surface, the passenger entrance leading straight onto said flat floor surface without any intervening steps or other obstacles that might impede passengers, particularly those of limited mobility.

Preferably, there are located one or more steps between the floor of the driver area and the floor of the adjacent portion of the passenger area.

Preferably, the partition is formed partly, substantially or wholly of one or more plastics material, and may be partly, substantially or wholly transparent.

Preferably, the driver's area includes a central passageway extending from the adjacent portion of the passenger area. Also preferably, the driver's area includes one or more additional seats or seating.

Preferably a communication link is provided for enabling communication between the driver in the driver's area and any passengers in the passenger area. In a preferred embodiment the communication link comprises a visual communication link.

Preferably an elongate duct is provided along a central region of the ceiling of the passenger area of the vehicle within which duct is contained heating conduits, wiring and lighting devices for the passenger area.

According to a second aspect of the present invention, there is provided a passenger service vehicle having a driver's area and a passenger area, the vehicle having a visual communication link between the driver's area and the passenger area permitting communication between the driver and any passengers.

Preferably, the visual communication system is a video link or the like, generally comprising one or more monitors at each end of the link, and generally providing visual and oral communications.

According to one embodiment of the present invention, that end of the visual communication link for the driver is located forward of the driving position of the driver, such that the driver does not need to significantly alter his driving position to engage with the visual communication link. That end of the link in the passenger area is preferably at or near the forwardmost part of the passenger area.

The visual communication link may be one way or two way, and preferably includes one or more means at or near the passenger end of the visual communication link for alerting the driver's attention.

According to another embodiment of the present invention, the visual communication link comprises a driver communication console, and one or more passenger communication consoles. The driver's communication console may be movable, for instance between operational and storable positions. The driver's communication console may be combined with or separate from the normal driver's "dashboard" containing the speedometer and other vehicle condition indicating devices and controls.

According to a third aspect of the present invention there is provided a passenger service vehicle having two or more wheel axles, wherein the driver's seat is located wholly or substantially over the front wheel axle.

According to a fourth aspect of the present invention, there is provided a passenger service vehicle having a driver's area at the front thereof, wherein that part of the front and side portions of the driver's area visible to the driver in a normal driving position is wholly or substantially transparent, and preferably formed of glass or another transparent material, and preferably including leg and feet areas.

The passenger service vehicle of the present invention can be any form of bus, coach, etc., designed to carry passengers, such vehicles being generally well known in the art. The passenger service vehicle may be single-or double-decked, and includes hybrid vehicles or trams and the like. In a preferred embodiment the passenger service vehicle comprises a low floor bus. The bus may be articulated, that is having front and rear sections interconnected by means of a pivot axis to permit articulation of the vehicle during turns, both front and rear sections having passenger seating capacity. Where the bus is articulated the motive unit, such as an internal combustion engine, may be provided in either the front or rear section of the bus.

Embodiments of the present invention will now be described by way of example only, and with reference to the accompanying drawings in which.

Figure 1:
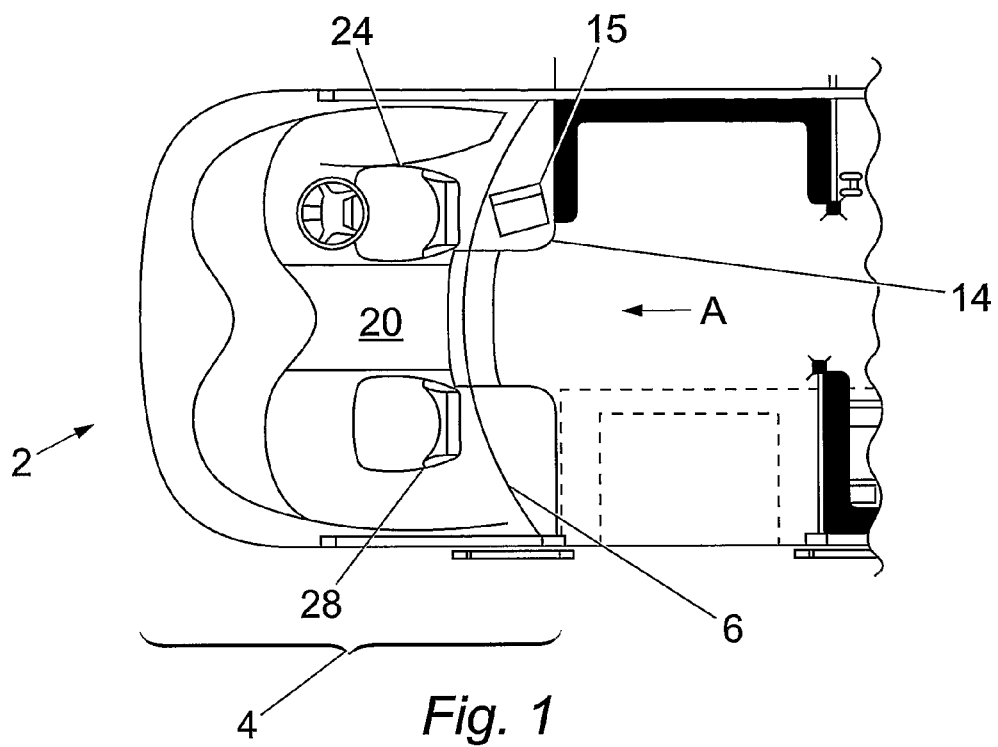
FIG. 1 is top view of the front portion of a passenger service vehicle according to one aspect of the present invention.

Referring to the drawings, the figures show the front portion of a passenger service vehicle 2, having an area for the driver 4. This driver's area 4 is separated from the remainder of the passenger service vehicle 2, comprising the passenger area including a plurality of passenger seats and at least one passenger entrance, by a series of parts generally forming a concave partition 6. The concave partition 6 forms a generally pleasing and aesthetic arrangement that extends wholly across the front of the vehicle 2.

The middle part of the partition 6 is hinged to form a door portion 10. Preferably, the door portion 10 and passenger-side panel 12 are wholly or substantially transparent so as to increase the view and thus disposition of the forward most passengers.

The driver-side part 14 of the concave partition can be solid, and preferably includes a monitor 15 or the like for visual communication between the passengers and the driver.

Figure 2:
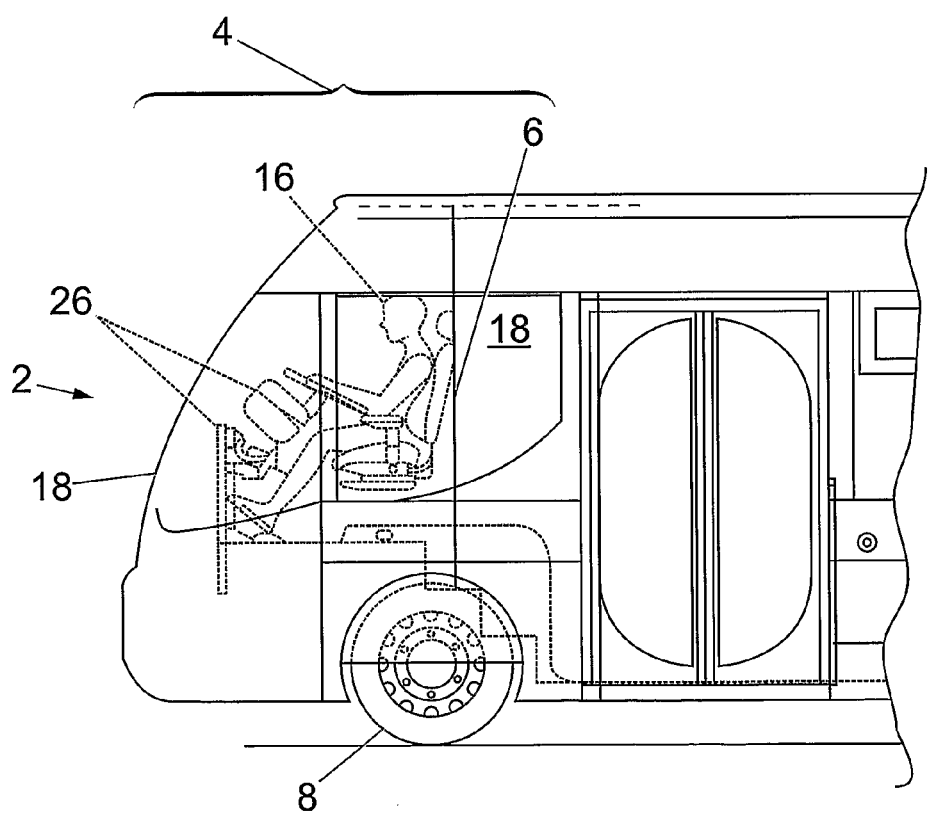
FIG. 2 is a side view of the vehicle of FIG. 1.
Figure 3:
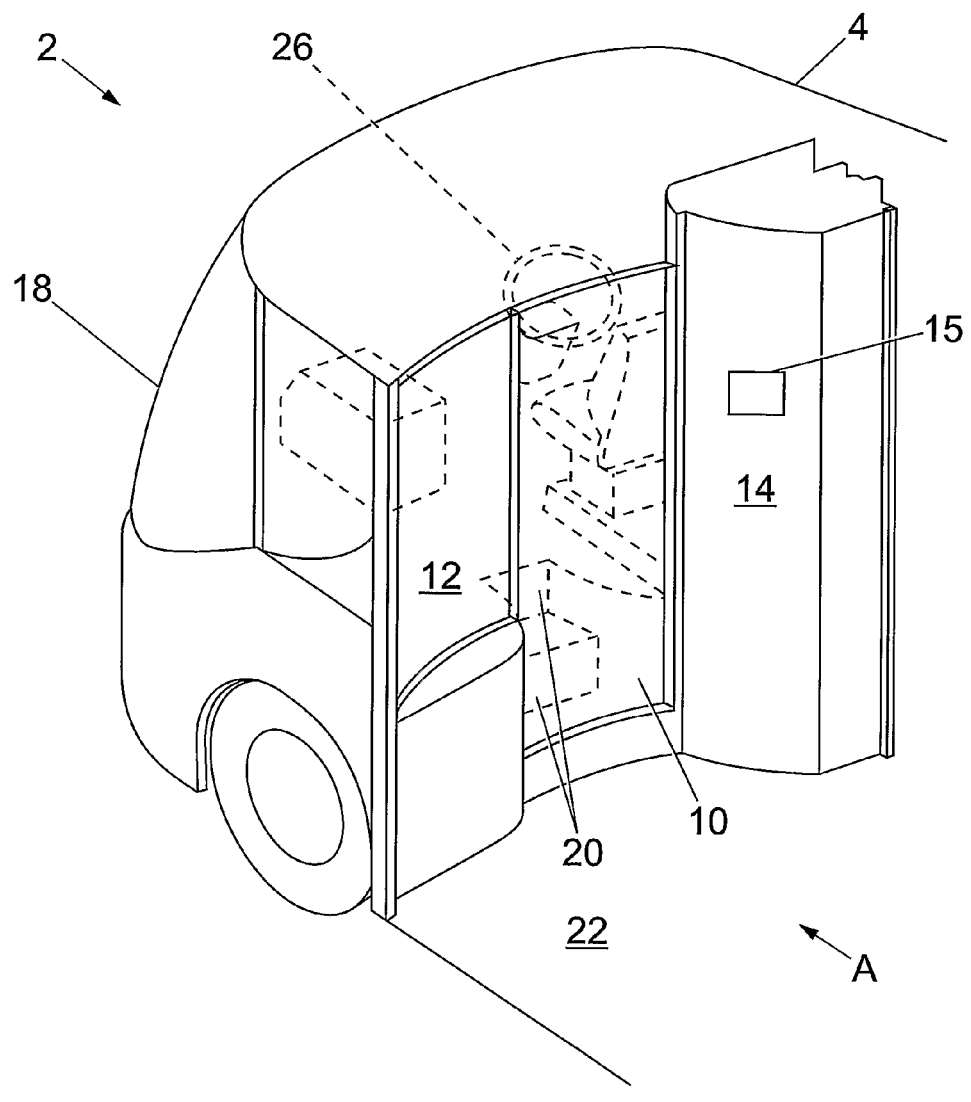
FIG. 3 is a schematic and perspective forward facing view of the driver area of the vehicle in FIGS. 1 and 2.
Figure 4:
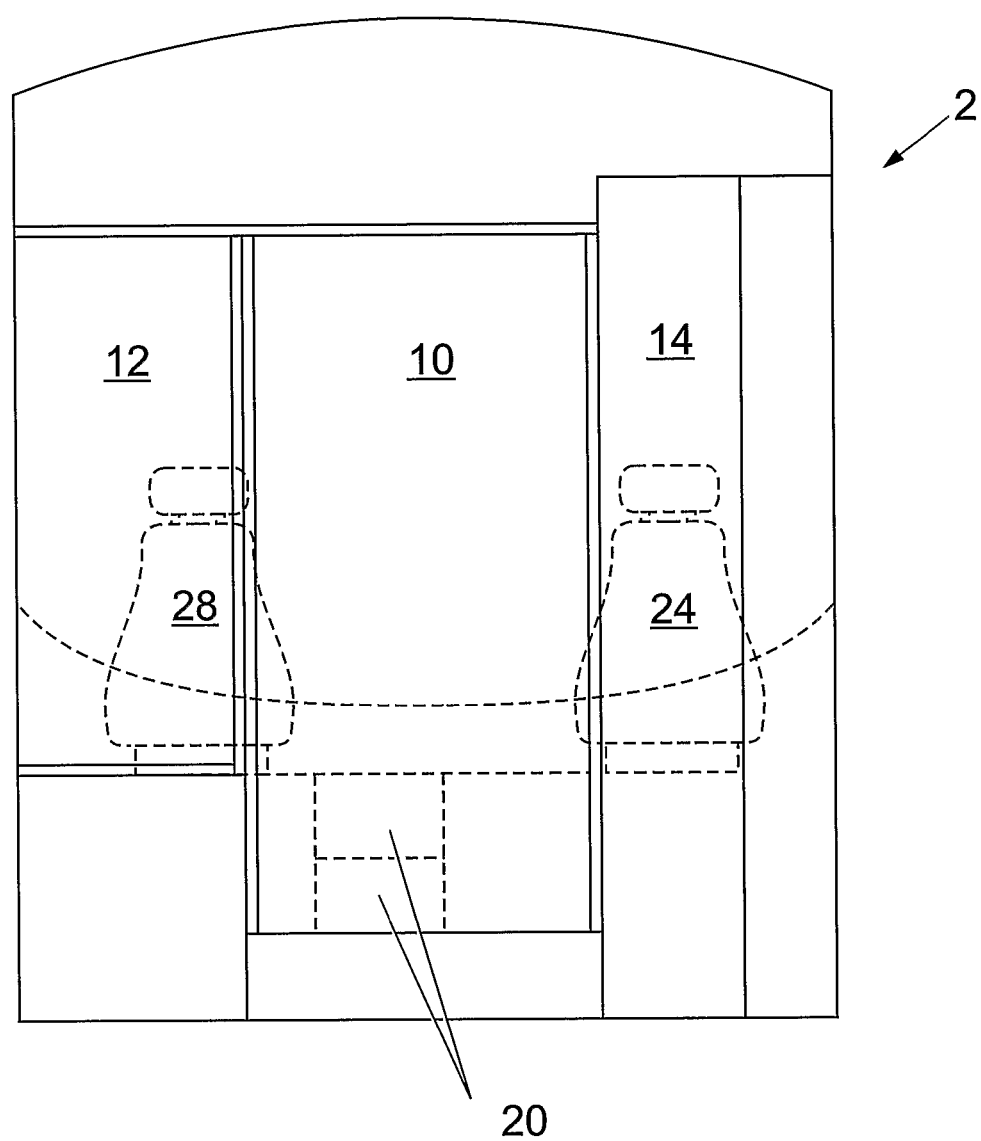
FIG. 4 is a view from Arrow A in FIGS. 1 and 3.

The driver 16 and his seat 24 are located above the axle of the front wheels 8. The driver 16 and his seat 24 are located further away from the nearest side frame of the vehicle 2 than in prior art buses, and further away from the frame at the front of the vehicle 2 than before. This driver position is different to that in any other previous passenger service vehicle, and provides the driver with significantly increased ergonomics as well as significantly increased visibility. This can be seen from the drawings, where the majority of the front and side views of the driver in a normal driving position are transparent. As shown in FIG. 2 especially, the front and side windows 18 extend the length and width of the seated driver 16. This includes the area around the driver's legs and feet. Altogether, there is significantly increased visibility for the driver both around himself, and to outside vehicle 2.

The position of the driver, located further away from the nearest side frame of the vehicle 2 and further away from the frame at the front of the vehicle 2 than prior art buses, enables the front of the bus to have increased curvature in plan view, providing aerodynamic benefits.

A curved display panel is provided in or adjacent the upper region of the front window for displaying information identifying the destination of the vehicle and/or information identifying the vehicle or providing any other information relating to the vehicle or its operation.

The driver's area 4 is in a raised position compared with the general floor level 22 of the passenger area of the vehicle. This floor level of the drivers area 4 is located above both front wheel arches, as most clearly shown in FIG. 2. This raised position helps provide the driver 16 with the increased visibility herein described.

The general floor area 22 is generally flat and at the same level as the door area 23 such that the door area leads straight into the passenger seating area without any intervening steps or other obstacles which might impede passengers, particularly those of limited mobility.

Between the door portion 10 of the partition 6 and the driver's area floor level 20, there are two steps 20. Thereafter, the driver's position is on one side of the area 4, depending upon whether the vehicle is left hand drive, or right hand drive (as shown in the drawings). A monitor for the driver 16 (not shown) to communicate with passengers (via their monitor 15) could be located forwardly and centrally in the driver's area 4, and designed to move, possibly by rotation and/or extension, between a non-use position, and a use position when the driver 16 is in his driving position. Alternatively the monitor could be mounted above and in front of the driver's head or in any other suitable position whereby the driver can view the monitor without having to take his attention from the road ahead.

The position of the driver 16 reduces distraction of the driver during movement of the vehicle 2 by passengers, thereby significantly increasing safety of the vehicle 2 during motion.

The driver 16 is located on a seat 24 for driving the vehicle 2, and is located in front of the steering wheel and general vehicle controls 26. The driver's area 4 preferably includes seating 28 for another driver, or driver assistant, or other person such as a vehicle employee. This user also has the significantly increased visibility afforded to the driver 16.

In general, the passenger service vehicle 2, generally being a bus or coach or the like, has an enhanced visibility driver's area 4, which area can be separated from the passenger area by the concave partition arrangement 6. The partition 6 may be solid or otherwise toughened, in order to provide the driver with protection against unwanted actions by passengers, whilst not hindering the views of on-board passengers. The use of monitors 15 also enhances driver safety, and reduces distraction of the driver by passengers.

The size and shape of the front window 18 of the vehicle 2 significantly increases the view and visibility of the driver.

The present invention provides features and aspects adapted to improve passenger service vehicles, and in particular the ergonomics of the driver.

The invention claimed is:

1. A passenger service vehicle in the form of a bus or coach having a driver's area including a driver's seat and driving controls and a passenger area including at least one passenger entrance and a plurality of passenger seats, the driver's area being defined by the front of the vehicle, and the foremost portion of each side of the vehicle, and a partition extending across a front portion of the passenger service vehicle to separate the driver's area from the passenger area, wherein the partition extends across the width of the vehicle and wherein the partition is concave in shape when viewed from the passenger area.

2. A passenger service vehicle as claimed in claim 1, wherein the partition includes a central section, comprising a door providing access to the driver's area.

3. A passenger service vehicle as claimed in claim 1, wherein the passenger service vehicle includes two or more wheel axles, wherein the driver's seat is located over the front wheel axle, the partition being provided behind the front wheel axle.

4. A passenger service vehicle as claimed in claim 1, wherein the driver's area is above the level of at least the adjacent portion of the passenger area.

5. A passenger service vehicle as claimed in claim 1, wherein a passenger entrance having at least one door is provided directly behind the partition separating the driver's area from the passenger area.

6. A passenger service vehicle as claimed in claim 5, wherein the passenger area has a flat floor surface, the passenger entrance leading straight onto said flat floor surface without any intervening steps or other obstacles that might impede passengers.

7. A passenger service vehicle as claimed in claim 1, wherein there are located one or more steps between the floor of the driver's area and the floor of the adjacent portion of the passenger area.

8. A passenger service vehicle as claimed in claim 1, wherein the partition is formed of plastics materials.

9. A passenger service vehicle as claimed in claim 1, wherein the driver's area includes a central passageway extending from the adjacent portion of the passenger area.

10. A passenger service vehicle as claimed in claim 1, wherein the driver's area includes additional seating in addition to a driver's seat.

11. A passenger service vehicle as claimed in claim 1, wherein a communication link is provided for enabling communication between the driver in the driver's area and any passengers in the passenger area.

12. A passenger service vehicle as claimed in claim 11 wherein the communication link comprises a visual communication link between the driver's area and the passenger area permitting communication between the driver and any passengers.

13. A passenger service vehicle as claimed in claim 12, wherein the visual communication system is a video link, generally comprising one or more monitors at each end of the link, and generally providing visual and oral communications.

14. A passenger service vehicle as claimed in claim 12, wherein the visual communication includes means at or near the passenger end of the visual communication link for alerting the driver's attention.

15. A passenger service vehicle as claimed in claim 1, wherein that part of the front and side portions of the driver's area visible to the driver in a normal driving position is in the majority transparent.

16. A passenger service vehicle as claimed in claim 15, where said part of the front and side portions of the driver's area are formed of glass or another transparent material.

17. A passenger service vehicle as claimed in claim 15 wherein the said part of the front and side portions of the driver's area includes the leg and feet areas of the driver.

18. A passenger service vehicle as claimed in claim 1, wherein the partition is formed partly of plastic material.

19. A passenger service vehicle as claimed in claim 1, wherein the partition is transparent.

20. A passenger service vehicle, as claimed in claim 1, wherein the partition is partly transparent.

* * * * *